US012602272B2

(12) United States Patent
Orf et al.

(10) Patent No.: US 12,602,272 B2
(45) Date of Patent: Apr. 14, 2026

(54) CIRCUITRY FOR ROUTING AND DELAY CORRECTION IN A MULTI-FUNCTIONAL UNIT SYSTEM

(71) Applicant: Mellanox Technologies, Ltd., Yokneam Illit (IL)

(72) Inventors: Diane Orf, Natick, MA (US); Mark Rosenbluth, Uxbridge, MA (US); Michael Cotsford, Medway, MA (US); Rui Xu, Marlborough, MA (US); Shreya Tekade, Framingham, MA (US)

(73) Assignee: Mellanox Technologies, Ltd., Yokneam Illit (IL)

( * ) Notice: Subject to any disclaimer, the term of this patent is extended or adjusted under 35 U.S.C. 154(b) by 456 days.

(21) Appl. No.: 18/094,182

(22) Filed: Jan. 6, 2023

(65) Prior Publication Data

US 2024/0231967 A1    Jul. 11, 2024

(51) Int. Cl.
| | |
|---|---|
| *G06F 9/46* | (2006.01) |
| *G06F 9/52* | (2006.01) |
| *G06F 9/54* | (2006.01) |

(52) U.S. Cl.
CPC ............... *G06F 9/546* (2013.01); *G06F 9/52* (2013.01)

(58) Field of Classification Search
CPC ................................... G06F 9/546; G06F 9/52
See application file for complete search history.

*Primary Examiner* — Gregory A Kessler
(74) *Attorney, Agent, or Firm* — Lowenstein Sandler LLP

(57) ABSTRACT

An integrated circuit includes a set of functional units having at least a first functional unit and a second functional unit. The first functional unit includes first processing circuitry and a first circuit coupled to the first processing circuitry to receive a message from the second functional unit of the set of functional units. The first circuit is further to delay the message for the first processing circuitry for a predetermined duration, where the predetermined duration is based at least in part on a first value representing a first distance between the first functional unit and the second functional unit and a second value representing a second distance between the second functional unit and a functional unit of the set of functional units that is farthest away from the second functional unit.

20 Claims, 8 Drawing Sheets

*200

CIRCUITRY FOR ROUTING AND DELAY CORRECTION IN A MULTI-FUNCTIONAL UNIT SYSTEM

TECHNICAL FIELD

At least one embodiment pertains to processing resources used to perform and facilitate delay correction in a multi-functional unit system using circuitry. For example, at least one embodiment pertains to technology for circuitry for routing and delay correction in a multi-functional unit system. For example, at least one embodiment relates to transmitting messages and delaying them so they are simultaneously processed by functional units.

BACKGROUND

An integrated circuit (e.g., a chip, system on a chip, system-on-chip, etc.) can include multiple functional units arranged in an array. For example, a data processing unit (DPU) can include multiple functional units (e.g., processors, central processing units (CPU), graphics processing units (GPUs), etc.), where different functional units perform different functions. For example, some functional units include processor cores, other functional units communicate with peripheral component interconnect express (PCIe) links, and some functional units handle device interrupts (e.g., handle signals indicating an error at the device that should be attended to immediately). In some examples, the functional units can communicate messages with one another to perform respective operations. For example, functional units can communicate events or initiate operations via messages—e.g., transmit messages indicating to initiate a timer. Some messages need to be transmitted from one functional unit to multiple functional units and processed at the same time—e.g., one functional unit can transmit messages to multiple other functional units, where the message is intended to be processed simultaneously. For example, one functional unit can transmit a message to a second and third functional unit to initiate a timer, where the timer is to be initiated at the second and third functional units at the same time. However, some solutions include a mesh interconnect to pass messages between functional units. The mesh interconnect can ensure messages are delivered in a timely manner but cannot guarantee each message will be received or processed by functional units at the same time. Accordingly, the mesh interconnect can fail to deliver latency-sensitive messages at the same time to multiple functional units as required by the latency-sensitive message.

BRIEF DESCRIPTION OF DRAWINGS

Various embodiments in accordance with the present disclosure will be described with reference to the drawings, in which.

DETAILED DESCRIPTION

Figure 1:
FIG. 1 illustrates an example communication system, in accordance with at least some embodiments.
Figure 1:
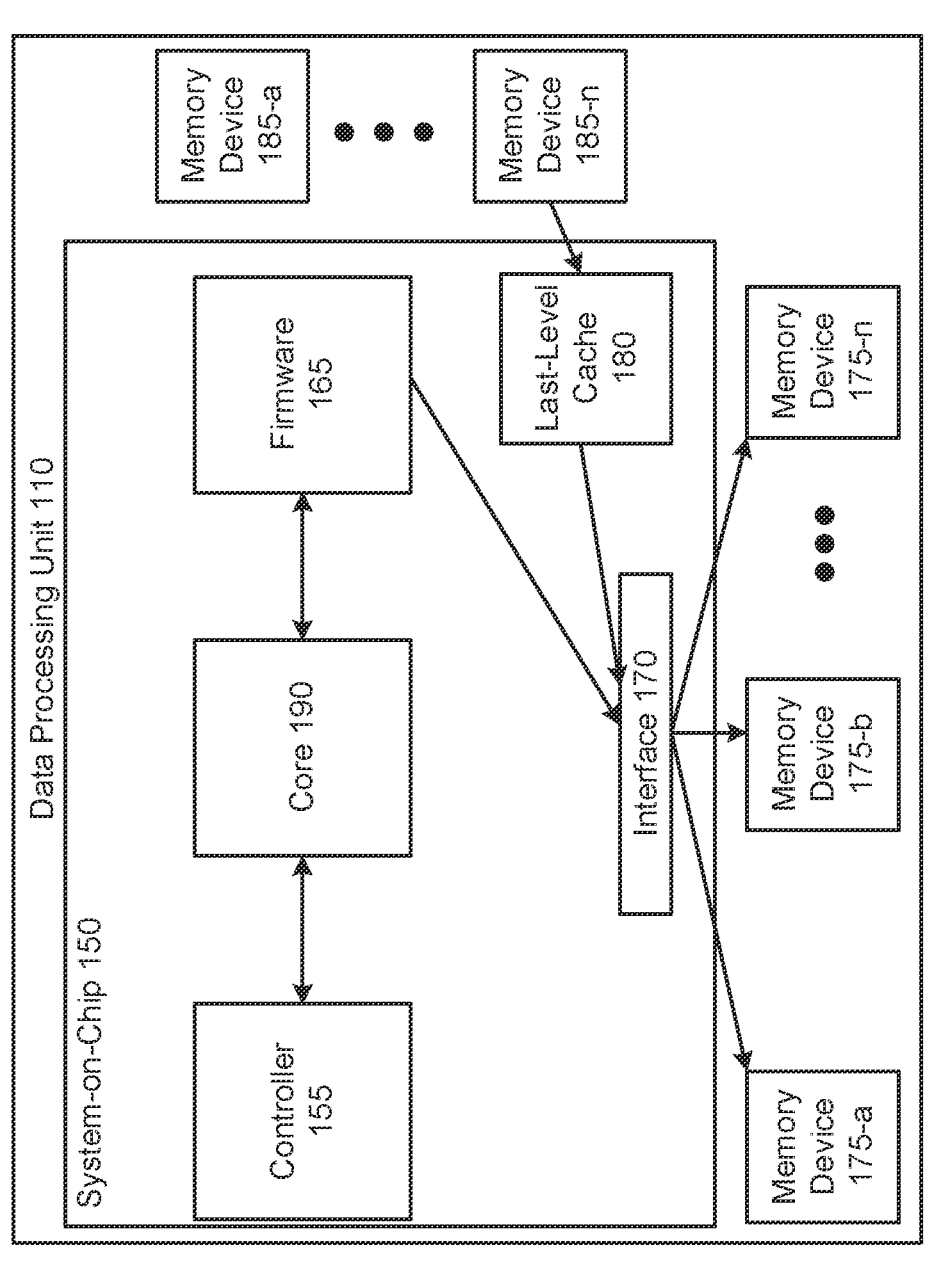

As described above, integrated circuits can include multiple functional units (e.g., processors, central processing units (CPU), graphics processing units (GPUs), etc.), where different functional units perform different functions or operations. For example, some functional units include processor cores, other functional units communicate with peripheral component interconnect express (PCIe) links, and some functional units handle device interrupts (e.g., handle signals indicating an error at the device that should be attended to immediately). In some examples, the functional units can communicate with each other to initiate, process, or execute operations. Some operations performed at the integrated circuit are to be performed simultaneously at multiple functional units—e.g., the operation is to be processed simultaneously at a first functional unit and a second functional unit. For example, the operation can be to initiate a timer (e.g., a local functional unit timer) at the first functional unit and the second functional unit simultaneously. In other examples, the operation can be to process an event simultaneously at multiple functional units—e.g., the operation can indicate to initialize (e.g., startup) multiple functional units at a same time. However, some solutions include a mesh interconnect to pass messages between functional units. The mesh interconnect can ensure messages are delivered in a timely manner but cannot guarantee each message will be received or processed by functional units at the same time. For example, the mesh interconnect can transmit a message from the first functional unit to the second functional unit during a clock cycle. But if the message originates at a functional unit that is closer to the first functional unit than the second functional unit, the first functional unit will receive the message one clock cycle before the second functional unit. Accordingly, the mesh interconnect can fail to deliver latency-sensitive messages at the same time to multiple functional units as required by the latency-sensitive message. Some solutions can use point-to-point wires to deliver messages from one functional unit to multiple functional units simultaneously. However, point-to-point wiring can fail to scale as the overall number of functional units increases. That is, as the number of functional units increases, the wiring can become complex, convoluted, expensive, or physically impossible. As used herein, a "distance" between functional units refers to a measure corresponding o message transmission latency between the functional units. In various embodiments already described, the distance can correspond to (1) a number of intervening functional units, (ii) a number of clock cycles rex aired for a messag traverse between functional units, or (ii) components of a coordinate repre aatifving relative positions of functional units within the array (e.g., X-direction and Y direction distances). These repr sentations are equivalent in that each reflects relative message latency between functional units within the array.

Advantageously, aspects of the present disclosure can address the deficiencies above and other challenges by implementing circuitry within each functional unit that can route and delay messages. The system can utilize circuitry included within each functional unit for messages that are latency-sensitive—e.g., for messages that have to be processed simultaneously at multiple functional units. The circuitry for a functional unit can delay messages for a predetermined time before releasing the message to the functional unit for processing. In some examples, the circuitry can store information regarding a first distance between the respective functional unit and a first functional unit that transmits the message (e.g., the functional unit where the message originates from). The circuitry can also store information regarding a second distance between the first functional unit that transmits the message and a functional unit that is farthest away from the first functional unit that transmits the message. The circuitry can delay the message based on the first distance and the second distance—e.g., the circuitry can determine a delay amount based on a difference between the second distance and the first distance. For example, the circuitry can store information that its first distance corresponds to being four clock cycles away from the first functional unit and that the second distance corresponds to the furthest away functional unit being six clock cycles away. Accordingly, the functional unit could delay the message for two (2) clock cycles such that the furthest functional unit and the functional unit would process the message at the same time. In other examples, the distance can correspond to a distance in a first direction and a distance in a second direction (e.g., the distance can represent a point with a pair of numerical coordinates). In some examples, the system can continue utilizing a mesh interconnect for messages that are not latency-sensitive—e.g., for messages that do not have to be processed simultaneously at multiple functional units.

By utilizing the circuitry within each functional unit to route and delay messages, the multi-functional unit system can process messages simultaneously across multiple functional units.

FIG. 1 illustrates an example system 100. In at least one embodiment, the system 100 can include a data processing unit (DPU) 110. In some embodiments, DPU 110 can include a software-programmable multi-core central processing unit (CPU)—e.g., the DPU 110 can include a multi-core 190 central processing unit (CPU) in an ARM architecture (e.g., core 190) to facilitate processing data. In some embodiments, the DPU 110 can also include programmable acceleration engines that are capable of offloading and utilized in application performances for artificial intelligence or machine learning. In some embodiments, the DPU 110 can be incorporated in a smart network interface controller (NIC)—e.g., DPU 110 can be an example of network interface controllers (NICs). In at least one embodiment, DPU 110 can be an example of a NVIDIA® Blue-Field® data processing unit (DPU).

As illustrated in FIG. 1, in some embodiments the DPU 110 can include a system-on-chip (SOC) 150, memory devices 175, and memory devices 185. In at least one embodiment, the DPU 110 supports directly reading or writing to attached local peripheral memory devices 175 (e.g., Non-Volatile Memory Express (NVMe) drives or other storage devices) via a storage sub-system in response to remote initiator requests (e.g., content transfer requests received from devices over a network to which the data communication device is connected). In at least one embodiment, the DPU 110 can include memory devices 185 (e.g., a random-access memory (RAM) (e.g., Double Data Rate (DDR) memory)) which are used to transfer content between the data communication device and the memory devices 175, and vice-versa. In some embodiments, memory devices 175 can be coupled to the SOC 150 via interface 170. In at least one embodiment, the interface 170 is an example of peripheral component interconnect express (PCIe) interface.

In some embodiments, the SOC 150 can further include a controller 155 and firmware 165. In some embodiments, the SOC 150 can include a multi-core central processing unit (CPU) in an ARM architecture (e.g., core 190) to facilitate processing data. In such embodiments, the core 190 can couple the controller 155 with the firmware 165. In at least one embodiment, the SOC 150 can include a last-level cache (LLC) 180 shared by the controller 155 and firmware 165. In at least one example, the controller 155 is an example of a network interface controller coupling the DPU 110 to a user device or a computer network (e.g., cloud network).

In at least one embodiment, system 100 can correspond to one or more of a Personal Computer (PC), a laptop, a tablet, a smartphone, a server, a collection of servers, or the like. The system 100 can include or be included in a GPU, a switch (e.g., a high-speed network switch), a network adapter, a CPU, a memory device, an input/output (I/O) device, other peripheral devices or components on a system-on-chip (SoC), or other devices and components at which a signal is received or measured, etc. As another specific but non-limiting example, system 100 can correspond to servers offering information resources, services, and/or applications to user devices, client devices, or other hosts in the system 100. The system 100 can use communication networks that may be used to connect the DPU 110 to other devices, including an Internet Protocol (IP) network, an Ethernet network, an InfiniBand (IB) network, a Fibre Channel network, the Internet, a cellular communication network, a wireless communication network, a ground referenced signaling (GRS) link, combinations thereof (e.g., Fibre Channel over Ethernet), variants thereof, and/or the like.

The system 100 can include processing circuitry (not illustrated), which can comprise software, hardware, or a combination thereof. For example, the processing circuitry may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry may comprise hardware, such as an application-specific integrated circuit (ASIC). Other non-limiting examples of the processing circuitry include an Integrated Circuit (IC) chip, a Central Processing Unit (CPU), a Graphics Processing Unit (GPU), a microprocessor, a Field Programmable Gate Array (FPGA), a collection of logic gates or transistors, resistors, capacitors, inductors, diodes, or the like. Some or all of the processing circuitry may be provided on a Printed Circuit Board (PCB) or collection of PCBs. It should be appreciated that any appropriate type of electrical component or collection of electrical components may be suitable for inclusion in the processing circuitry.

In one embodiment, the DPU 110 can include one or more functional units that correspond to the SOC 150—e.g., one or more functional units that represent the controller 155, core 190, firmware 165, last-level cache 180, etc., as described with reference to FIG. 2.

Figure 2:
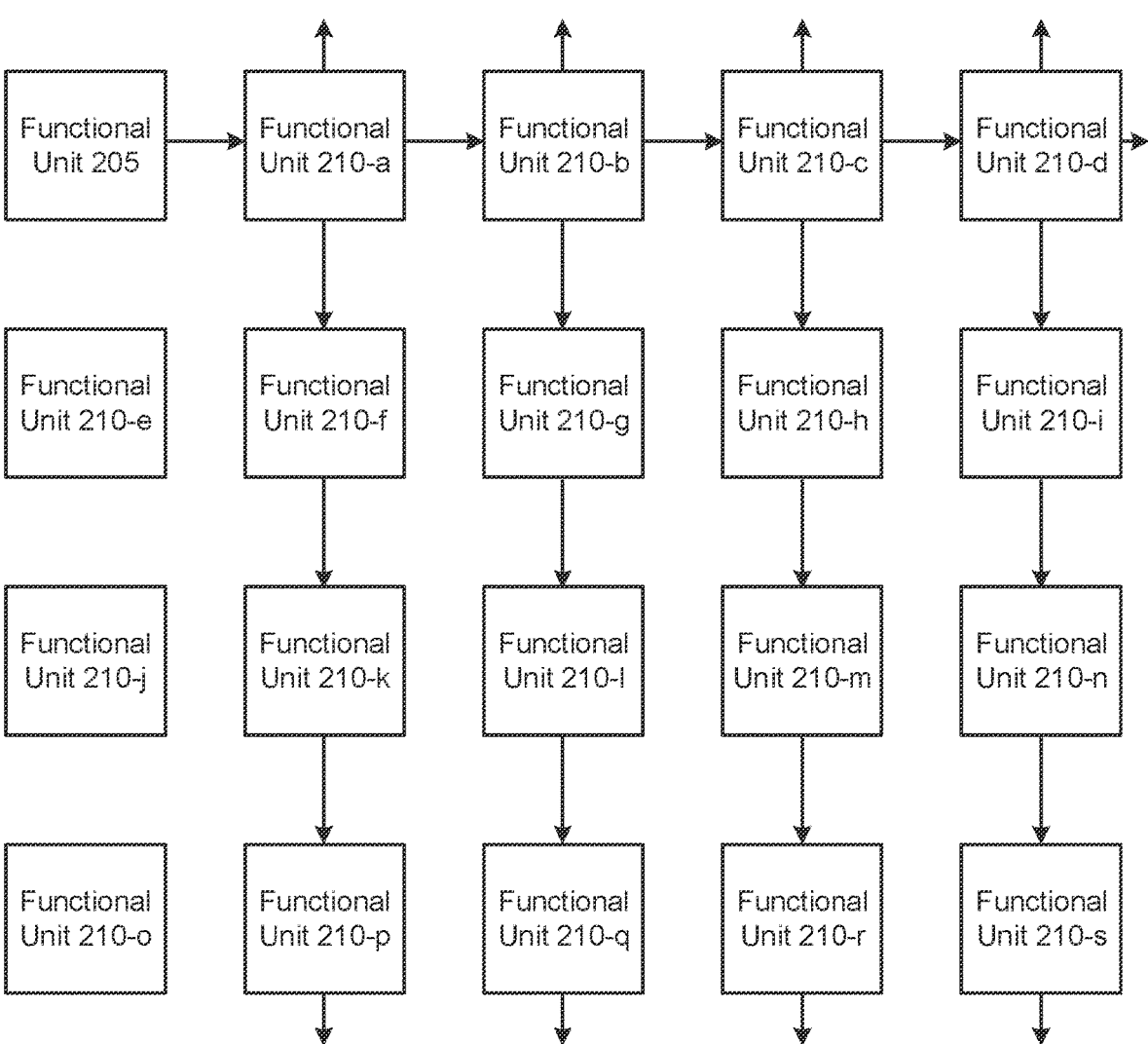
FIG. 2 is a diagram illustrating a multi-functional unit array, in accordance with at least some embodiments.

FIG. 2 illustrates a multi-functional unit array 200 utilizing circuitry for routing and delay correction, according to at least one example embodiment. In at least one embodiment, functional units 205 and 210 can be included in, part of, or make up the system-on-chip (SOC) 150 as described with reference to FIG. 1—e.g., one or more functional units 205 and 210 can be included in controller 155, core 190, firmware 165, interface 170, and/or last-level cache 180. Multi-functional unit array 200 can include functional unit 205 and functional units 210—e.g., functional units 210-*a* through functional unit 210-*s*. It should be noted the multi-functional array 200 can include any number of functional units 210 and that multi-functional unit array 200 is for illustrative purposes and not limiting on the claims—e.g., there can be any number of additional functional units 210.

In at least one embodiment, functional unit 205 can transmit messages to functional units 210. For example, functional unit 205 can transmit messages to multiple other functional units 210 at a same time—e.g., transmit messages to functional unit 210-*e* and 210-*f* at a same time. In some embodiments, functional unit 205 can receive messages from functional units 210, where the message is intended for multiple other functional units 210—e.g., other functional units 210 can use functional unit 205 to transmit messages to multiple other functional units 210 at a same time. In some embodiments, the functional unit 205 can transmit messages corresponding to events (e.g., messages indicating to initialize or start up) or messages corresponding to timing operations—e.g., transmit messages to initialize a timer of the respective functional unit 210. In at least one embodiment, functional unit 205 can include timers, interrupt controllers, interfaces (e.g., interface to universal serial bus (USB)), etc. In at least one embodiment, the functional unit 205 can be located close to or next to an input/output (I/O) port. In some embodiments, functional unit 205 can include circuitry as described with reference to FIG. 4 to route the messages to multiple other functional units. In some embodiments, the functional unit 205 can be coupled with the remaining functional units 210 via mesh interconnect. In such embodiments, the functional unit 205 can route messages intended for multiple other functional units 210 via the circuitry and route messages intended for one other functional unit 210 via the mesh interconnect.

In at least one embodiment, the functional unit 205 is configured to output or transmit messages in one direction. For example, in multi-functional unit array 200, functional unit 205 is configured to transmit messages to the right towards functional unit 210-*a*. As the functional unit 205 outputs messages in one direction, other functional units 210 in a same column or row as functional unit 205 can fail to receive any messages from functional unit 205. For example in multi-functional unit array 200, functional units 210-*e*, 210-*j*, and 210-*o* can fail to receive messages from the functional unit 205. In other embodiments, functional unit 205 can be located elsewhere in the multi-functional unit array. For example, the functional unit 205 can be located on a right (e.g., east) edge (e.g., where functional units 210-*e* or functional unit 210-*j* are located). In other embodiments, functional unit 205 can be located on a left (e.g., west) edge (e.g., where functional units 210-*d*, 210-*i*, 210-*n*, or 210-*s* are located), functional unit 205 can be located on an upper (e.g., north) edge (e.g., where functional units 210-*a*, 210-*b*, 210-*c*, 210-*d* are located), or functional unit 205 can be located on a lower edge (e.g., south edge) (e.g., where functional units 210-*p*, 210-*q*, 210-*r*, and 210-*s* are located). In either embodiment, the functional unit 205 can transmit messages in one direction from one of the edges of the multi-functional unit array 200. In some embodiments, functional units 210 can transmit a message to functional unit 205 to distribute the message to multiple other functional units 210 at a same time—e.g., transmit a message corresponding to an initialization operation to functional unit 205 so that the message can be transmitted to multiple functional units 210 at the same time. In at least one embodiment, functional units 210 can include circuitry for delaying messages received as described with reference to FIG. 4.

In some embodiment, functional units 210 can perform operations or include processors (e.g., central processing units (CPUs) or graphics processing units (GPUs)), logic to communicate with interfaces (e.g., logic to communicate with interface 170 as described with reference to FIG. 1), include last-level cache system, etc. In at least one embodiment, functional units 210 can receive messages, transmit messages, process messages, etc. In at least one embodiment, functional units 210 can transmit and receive messages according to a routing algorithm. For example, the functional units 210 can receive data or messages from one direction and receive non-data (e.g., zeros (0s)) from other directions. For example, functional unit 210-*f* can receive messages or data from functional unit 210-*a* but receive zeros from functional unit 210-*e*, functional unit 210-*g*, and functional unit 210-*k* (e.g., although not illustrated, each functional unit 210 can be coupled with neighboring functional units). Additionally, as the functional unit 205 is located in a northwest corner, the routing algorithm for multi-functional unit array 200 can indicate to transmit messages towards the southern direction—e.g., functional unit 210-*f* can transmit messages to functional unit 210-*k* based on the routing algorithm.

Figure 3:
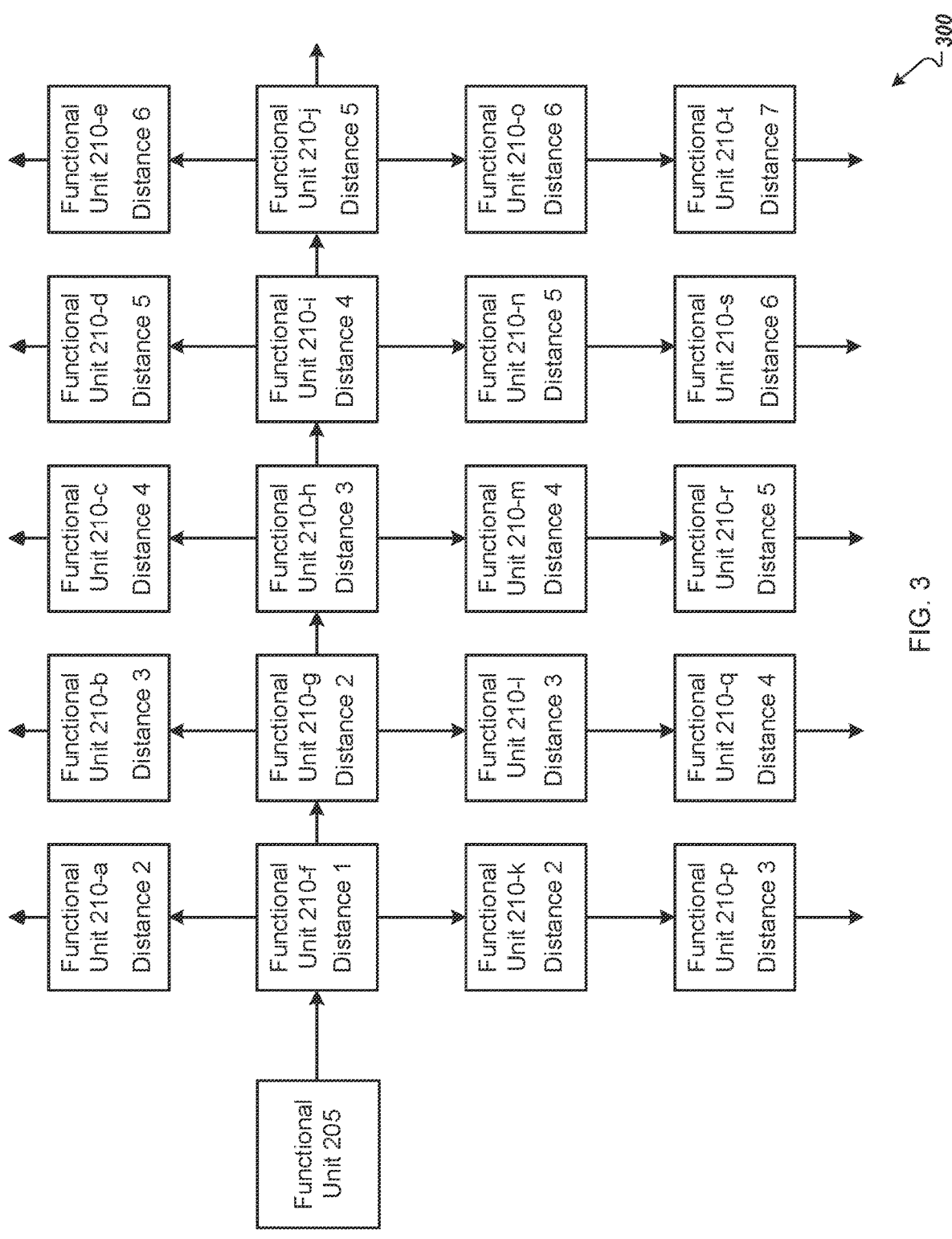
FIG. 3 is a diagram illustrating a multi-functional unit array, in accordance with at least some embodiments.

FIG. 3 illustrates a multi-functional unit array 300 utilizing circuitry for routing and delay correction, according to at least one example embodiment. In at least one embodiment, functional units 205 and 210 can be included in, part of, or make up the system-on-chip (SOC) 150 as described with reference to FIG. 1—e.g., one or more functional units 205 and 210 can be included in controller 155, core 190, firmware 165, interface 170, and/or last-level cache 180. Multi-functional unit array 300 can include functional unit 205 and functional units 210—e.g., functional units 210-*a* through functional unit 210-*t*.

In one embodiment, multi-functional unit array 300 illustrates a distance between each functional unit 210 and functional unit 205. For example, functional unit 210-*f* is located one (1) functional unit away from functional 205. In some embodiments, the multi-functional array 200 can transmit a message between functional units during one (1) clock cycle—e.g., it can take one (1) clock cycle for a message to travel between functional unit 205 and functional unit 210. For example, the functional unit 205 can transmit a message to functional unit 210-*n* that takes five (5) clock cycles to travel from functional unit 205 to functional unit 210-*n*. As illustrated in multi-functional unit array 300, a farthest away functional unit 210-*t* can be seven (7) clock cycles or functional units away. Accordingly, even if the functional unit 205 transmits messages for multiple functional units 210 at the same time, functional units 210 can receive the messages at different times due to the distance—e.g., functional unit 210-*f* can receive the message six (6) clock cycles before functional unit 210-*t* receives the same message. Accordingly, each functional unit 210 can include circuitry for delaying messages for a pre-determined time so that each functional unit 210 can process a message from functional unit 205 at the same time as described with reference to FIGS. 4-6.

It should be noted, the distance indicated in multi-functional unit array 300 is one example and other examples are possible. For example the distance from functional unit 205 to a respective functional unit 210 can be denoted by a coordinate system. For example, although functional unit 210-*m* and functional unit 210-*i* are both four (4) units away, functional unit 210-*m* can be three functional units away in a first direction (e.g., in a horizontal or X-direction) and one functional unit away in a second direction (e.g., in a vertical or Y-direction) while functional unit 210-*i* can be four functional units away in the first direction and zero functional units away in the second direction. That is, the distances can be represented as (X,Y) coordinates instead— e.g., functional unit 210-*a* can have a coordinate (1,1) (e.g., one functional unit away in each direction) while functional unit 210-*t* can have a coordinate (5,2) (e.g., five functional units away in the first direction and two functional units away in the second direction). In at least one embodiment, each functional unit 210 can store its respective distance away from functional unit 205 as well as the distance from the functional unit 205 to the farthest functional unit 210 (e.g., seven (7) total, five (5) in the first direction, and two (2) in the second direction as illustrated in multi-functional unit array 300) as described with reference to FIG. 4.

Figure 4:
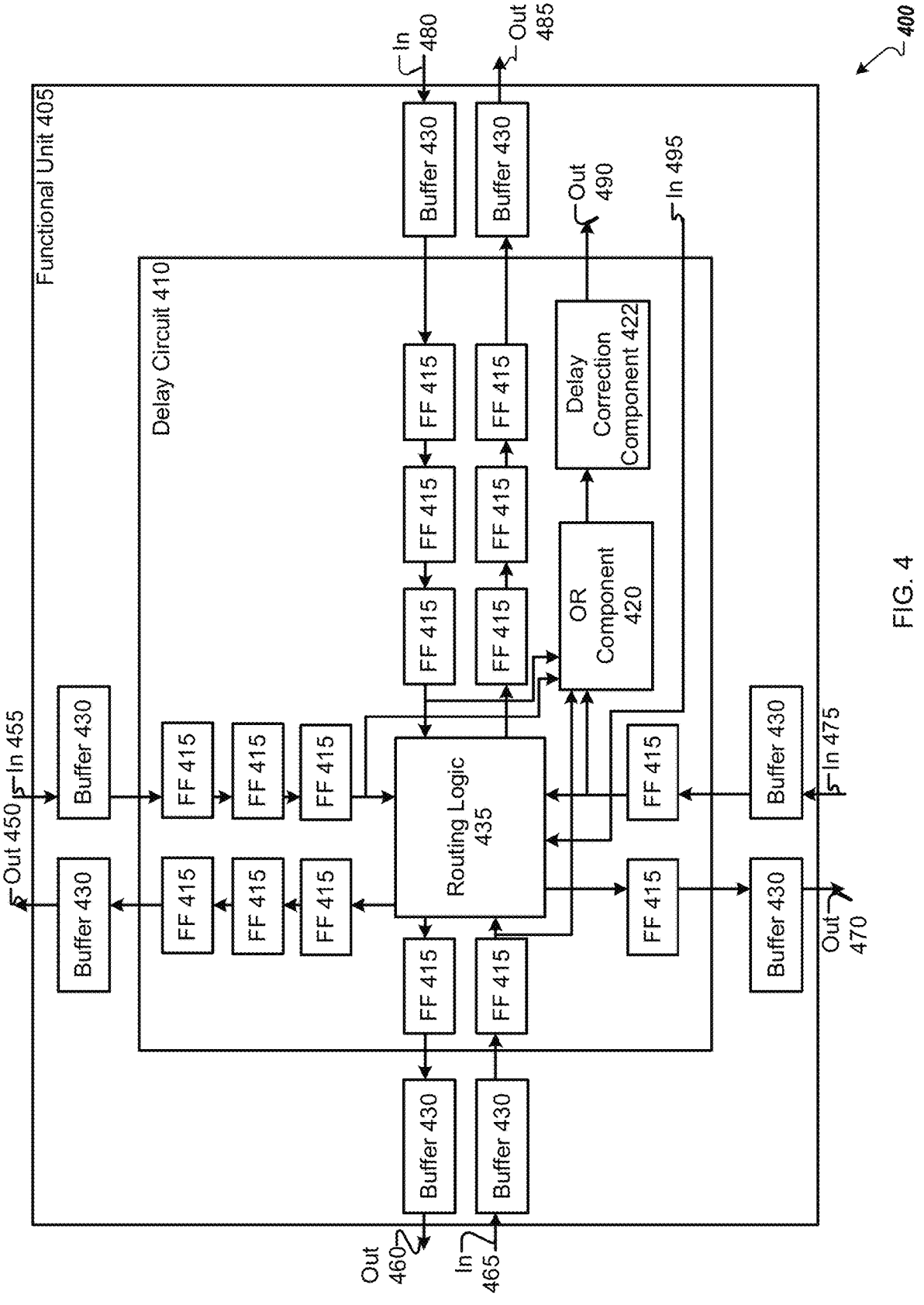
FIG. 4 illustrates an example circuitry for routing and delay correction, in accordance with at least some embodiments.

FIG. 4 illustrates an example communication system 400 according to at least one example embodiment. In at least one embodiment, the system 400 can include a functional unit 405—e.g., an example of functional unit 205 or functional unit 210 as described with reference to FIG. 2. In at least one embodiment, functional unit 405 includes delay circuit (e.g., time aligning circuit or delay correction circuit) 410. As described with reference to FIGS. 2 and 3, the functional unit 405 can be coupled with neighboring functional units—e.g., the functional unit 405 is coupled with another functional unit in all directions. Accordingly, the functional unit 405 can transmit messages from out 450, out 460, out 470, and out 480 and receive messages at in 455, in 465, in 475, and/or in 485.

As described with reference to FIG. 2, the functional unit 405 can receive non-data (e.g., zero (0s)) in all but one direction based on the location of the functional unit 205 and the routing algorithm used by routing logic 435. In some embodiments, the functional unit can include buffers 430. The delay circuit 410 can include flip-flops (FF) 415, a logical disjunction ("OR") component 420, and delay correction component 422. As described with reference to FIG. 2, messages can be transmitted from functional unit 205 to multiple functional units 210. In one embodiment, each functional unit 210 and functional unit 205 can utilize the delay circuit 410 to ensure the message is processed by each functional unit 210 at the same time. Other messaging can be communicated via a mesh interconnect as described with reference to FIG. 2.

In at least one embodiment, although delay circuit 410 is shown positioned in the center of functional unit 405, it can be located anywhere within functional unit 405. For example, the delay circuit 410 can be at a lower left corner, upper left corner, upper right corner, lower right corner, etc. In some embodiments, the flip-flops 415 can be included outside of the delay circuit 410—e.g., the flip-flops 415 can be spread out through functional unit 405 though they are considered part of the delay circuit 410. It should be noted the functional unit 405 can include any number of flip-flops 415 in any direction and that diagram 400 illustrates one embodiment. For example, the delay circuit 410 can include two (2) flip-flops 415 in all directions, or one flip-flop 415 in a north and east direction while including three (3) flip-flops in a west and south direction—e.g., the flip-flop 415 configuration can be the opposite of the one illustrated in multi-functional unit array 300. A number of flip-flops 415 in a given direction can vary based on a location of the delay circuit 410 or size of functional unit 405. For example, there could be three (3) flip-flops 415 in the west and south direction and one (1) flip-flop 415 in north and east direction if the delay circuit 410 is located in a northeast corner of functional unit 405. In other embodiments, there could be four (4) or more flip-flops in the east or north direction if the functional unit 405 is larger than illustrated. It should be noted that the number of flip-flops 415 illustrated in FIG. 4 represents one example configuration, and other configurations consistent with the described delay correction principles may be used.

In one embodiment, the functional unit 405 is configured to receive a message from functional unit 205 (e.g., functional unit 205 is configured to route the message to routing logic 435 of the delay circuit 410 via the in 495). In some embodiments, the functional unit 405 can receive the message directly from the functional unit 205 (e.g., the functional unit 405 is coupled to functional unit 205) or receive the message via other functional units 210. In at least one embodiment, the functional unit 405 can receive a message at in 455, in 465, in 475, or at in 485—e.g., the functional unit 405 can receive data/messages from one direction and non-data (e.g., zeros 0s) from the remaining directions. In some embodiments, the message can be received at a buffer 430 and then transmitted through one or more flip-flops 415 to the routing logic 435—e.g., the buffer 430 and flip-flops 415 can store the data or message for a certain duration before transmitting it to the next component. In at least one embodiment, the delay circuit 410 can route all the incoming signals to the OR component 420. Because the functional unit 405 receives zeros (0s) from three (3) directions and the message from one (1) direction, the OR component 420 can enable the delay circuit 410 to determine the message received—e.g., the OR component 420 can filter the zeros out. Accordingly, the functional unit 405 does not necessarily include a routing algorithm that indicates which direction the message is received, rather the functional unit 405 can rely on the OR component 420 getting the message by performing an OR operation on the signals received.

After the OR operation at OR component 420, the delay circuit 410 can delay the message by applying a delay correction component 422 before releasing it for processing by the functional unit 405. In at least one embodiment, the delay correction component 422 can delay the message for a predetermined duration as described with reference to FIG. 5. In the embodiments described herein, the predetermined duration corresponds to a difference between (i) a distance from the source functional unit to a farthest functional unit in the array and (ii) a distance from the source functional onit to the receiving functional unit, such tha messages originating f e fu: tion unit are released processing by multiple functional units substantially simultaneously. The delay correction component 422 can delay the message for the predetermined duration based on a distance between the functional unit 405 and the functional unit 205 (e.g., the functional unit that originally transmitted the message) as well as a distance between the functional unit 205 and a farthest functional unit 405 (e.g., a distance between functional unit 205 and functional unit 210-*t* as described with reference to FIG. 3.) Additional details regarding the delay correction component 422 are described with reference to FIG. 5. In at least one embodiment, the delay circuit 410 can release the message for processing after the predetermined duration—e.g., the delay circuit 410 can transmit the message to functional unit 405 via out 490.

In some embodiments, functional unit 405 can propagate the received message to additional functional units 210. For example, the functional unit 405 can transmit the message to a neighboring functional unit 210. In such embodiments, the routing logic 435 can utilize a routing algorithm to determine a direction to transmit the message out. That is, as described with reference to FIG. 2, each functional unit 405 can transmit the message in a respective direction based on a positioning of functional unit 205. For example, the functional unit 405 can transmit the message out via out 470 or out 480 (e.g., out of the southern or eastern edge) if the functional unit 205 is located in the position indicated in FIG. 3. In other embodiments, the functional unit 405 can transmit the message out a different direction based on the routing algorithm and positioning of the functional unit 205.

In some embodiments, the message can indicate to transmit a return message after the message is processed—e.g., transmit a response after processing the message. In such embodiments, the delay circuit 410 can receive the response at in 495 and the routing logic 435 can route the response back in the proper direction based on the routing algorithm. In some embodiments, the functional unit 405 can be an example of functional unit 205. In such embodiments, the functional unit 405 can receive all of the responses. In at least one embodiment, the functional unit 405 can use the delay correction component 422 to ensure all responses are delayed and released for processing at the same time.

Figure 5:
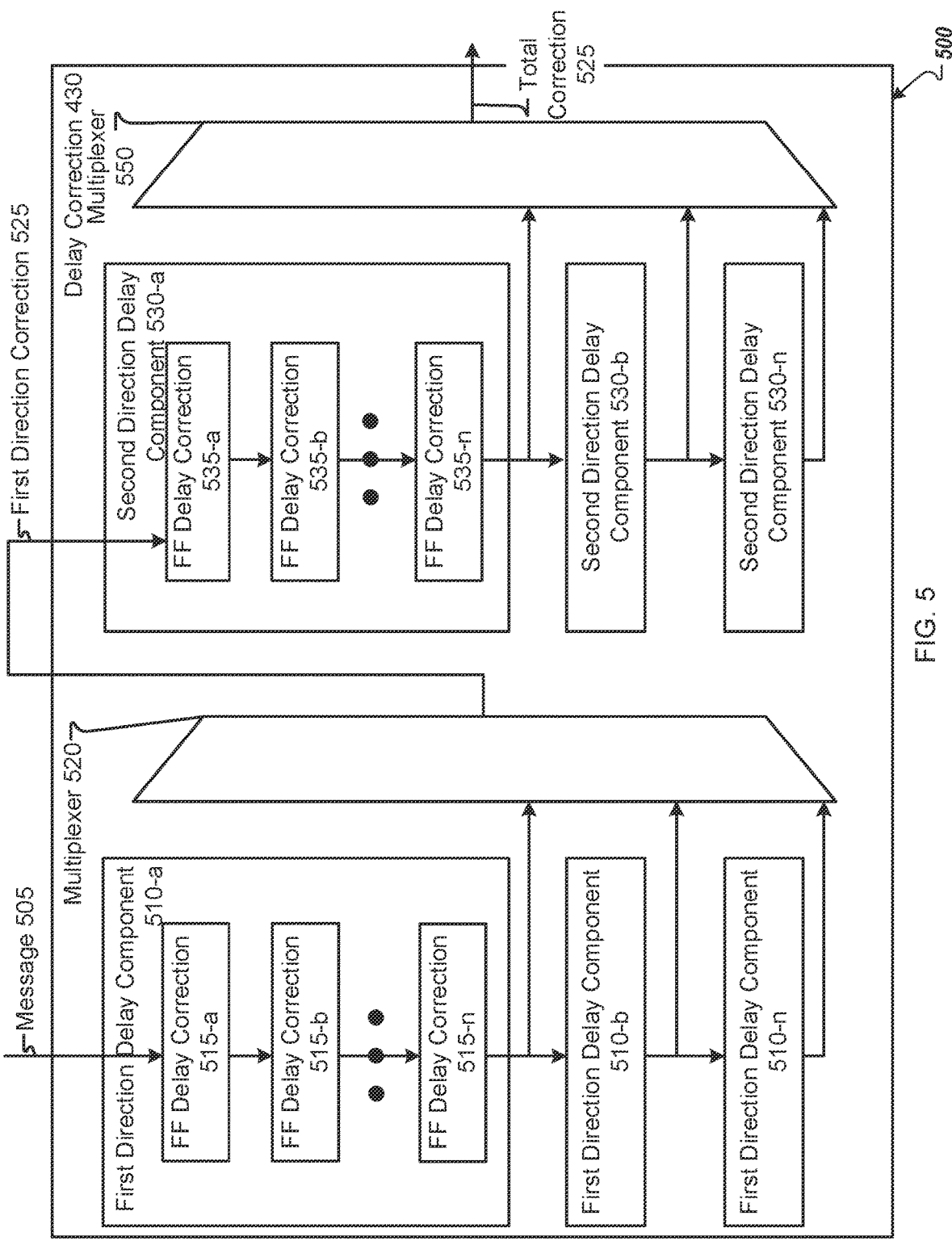
FIG. 5 illustrates example circuitry for delay correction, in accordance with at least some embodiments.

FIG. 5 illustrates an exemplary communication system 500 according to at least one example embodiment. In at least one embodiment, the system 500 can include a delay correction component 422 —e.g., delay correction component 422 as described with reference to FIG. 4 As described with reference to FIG. 4, the delay correction component 422 can be located within a delay circuit 410 and configured to delay messages for a predetermined time before releasing (e.g., transmitting) the message to the respective functional unit 405 for processing. In at least one embodiment, the delay correction component 422 can include first-direction delay components 510, second-direction delay components 530, multiplexer 520, and multiplexer 550. Each first direction delay component 510 can include one or more flip-flop (FF) delay corrections 515.

In one embodiment, delay correction component 422 is configured to receive message 505 (e.g., the original message from functional unit 205). In some embodiments, the delay correction component 422 can receive the message 505 at a first direction delay component 510. In one embodiment, the delay correction component 422 can include an "n" number of first-direction delay components 510. In some embodiments, the n" number can depend on a distance between the functional unit 205 and a farthest away functional unit 210. For example, each first distance delay component 510 can correspond to a delay associated with transmitting the message from one functional unit to the next functional unit in the first direction. In such examples, the delay correction component 422 can include the "n" number based on the farthest distance the message can travel in the first direction. For example, as illustrated in multi-functional unit array 300, the farthest the message can travel in the first direction is five (5). In such examples, the delay circuit 410 can include five (5) first-direction delay components 510. That is, each first-direction delay component can compensate for the delay associated with transmitting the message from one functional unit to subsequent functional unit in the first direction. In one embodiment, the delay correction component 422 can determine a number of first direction delay components to utilize by determining a difference between the distance between functional unit 205 and the farthest away functional unit 210 and a distance between the respective functional unit 405 and functional unit 205—e.g., Farthest distance—respective distance. For example, as illustrated in multi-functional unit array 300, a farthest distance is five (5) in the first direction. A delay correction component 422 of functional unit 210-*i* can determine the difference between 5 and two (2) (e.g., the distance in the first direction functional unit 210-*i* is from functional unit 205). Accordingly, the delay correction component 422 of functional unit 210-*i* would utilize three (3) first-direction delay components to compensate for the additional time it takes for the message to travel to functional unit 210-*t* in the first direction. In some embodiments, the delay correction component 422 can determine the difference based on a difference between coordinates of respective functional units—e.g., determine functional unit 210-*i* has a coordinate (2, 1) and functional unit 210-*t* has a coordinate (5,2) and determine a difference of three (3) in the first direction.

Figure 6:
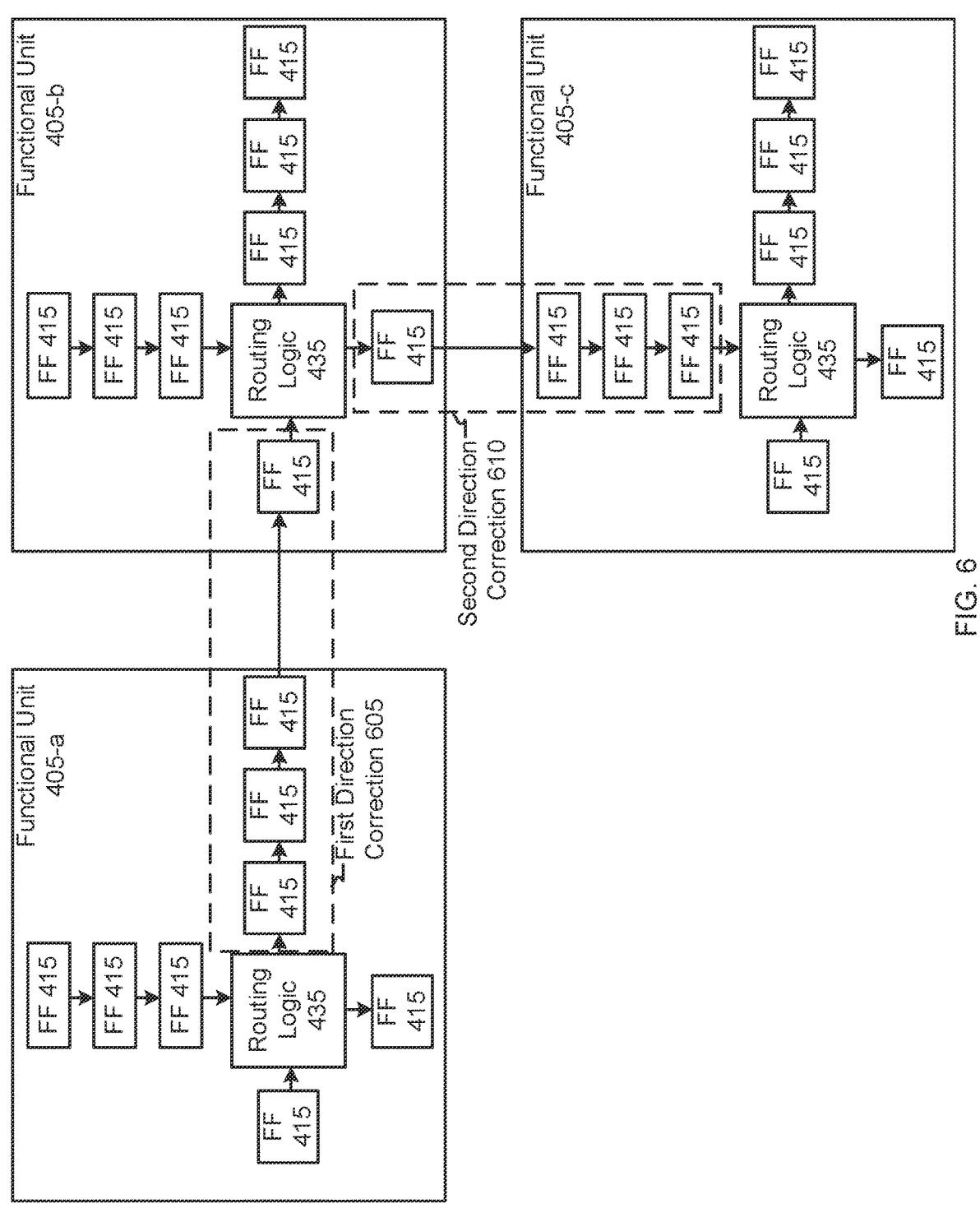
FIG. 6 illustrates an example system for delay correction, in accordance with at least some embodiments.

In at least one embodiment, the first direction delay component 510-*a* can delay the message at one or more flip-flop delay correction 515. In one embodiment, each first direction delay component 510 can include an "x" number of FF delay correction 515. In one embodiment, the "x" number can correspond to a number of flip-flops 415 along the respective first direction when transmitting messages from one functional unit 405 to the next subsequent unit 405. That is, each flip-flop delay correction 515 can compensate for a delay associated with transmitting the message through one (1) flip-flop 415 as described with reference to FIG. 4. In one embodiment, FIG. 6 illustrates a first direction correction 605. For example, to transmit the message from functional unit 405-*a* to functional unit 405-*b* along the first direction (e.g., along an X-direction or a horizontal direction going from left to right), the message goes through four (4) flip-flops 415—e.g., through three (3) flip-flops 415 in functional unit 405-*a* and one (1) flip-flop 415 in functional unit 405-*b*. Accordingly, in this embodiment, the first direction delay component 510-*a* can include four (4) FF delay correction 515—e.g., one for each flip-flop 415 encountered in the first direction. In some embodiments, the delay circuit can store a time associated with transmitting the message through one (1) flip-flop in the first direction and delay the message by that time at each FF delay correction 515—e.g., the delay circuit could store the time in seconds, milliseconds, microseconds, nanoseconds, picoseconds, etc. In other embodiments, the delay correction component 422 could store the time as a portion of the clock cycle taken to process the message at a respective flip-flop 415—e.g., store that each flip-flop 415 delays the message by a quarter (¼) of a clock cycle. Accordingly, in at least one embodiment, each unit of distance corresponds to one or more clock cycles, and the delay correction component delays the message by an integ x fractional number of clock cycles proportional to the difference in distances.

In one embodiment, multiplexer 520 is configured to output a total first direction correction 525 to the second direction delay component 530—e.g., the multiplexer can combine the respective delays of each first direction delay component 510 used and output the total to the second direction delay component 530.

In some embodiments, the second direction delay component 530 can receive the first direction correction 525. In one embodiment, the delay correction component 422 can include a "y" number of second direction delay components 530. In some embodiments, the "y" number can depend on a distance between the functional unit 205 and a farthest away functional unit 210. For example, each second distance delay component 530 can correspond to a delay associated with transmitting the message from one functional unit to the next functional unit in the second direction. In such examples, the delay correction component 422 can include the "y" number based on the farthest distance the message can travel in the second direction. For example, as illustrated in multi-functional unit array 300, the farthest the message can travel in the first direction is two (2). In such examples, the delay circuit 430 can include two (2) second-direction delay components 530. That is, each second-direction delay component can compensate for the delay associated with transmitting the message from one functional unit to subsequent functional unit in the second direction. In one embodiment, the delay correction component 422 can determine a number of second direction delay components to utilize by determining a difference between the distance between functional unit 205 and the farthest away functional unit 210 and a distance between the respective functional unit 405 and functional unit 205—e.g., Farthest distance—respective distance. For example, as illustrated in multi-functional unit array 300, a farthest distance is two (2) in the second direction. A delay correction component 422 of functional unit 210-i can determine the difference between two (2) and one (1) (e.g., the distance in the second direction functional unit 210-i is from functional unit 205). Accordingly, the delay correction component 422 of functional unit 210-i would utilize one (1) second direction delay component 530 to compensate for the additional time the message takes to travel to functional unit 210-t in the second direction. In some embodiments, the delay correction component 422 can determine the difference based on a difference between coordinates of respective functional units—e.g., determine functional unit 210-i has a coordinate (2,1) and functional unit 210-t has a coordinate (5,2) and determine a difference of one (1) in the first direction.

In at least one embodiment, the second direction delay component 530-a can delay the message at one or more flip-flop delay correction 515. In one embodiment, each second direction delay component 530 can include a "z" number of FF delay correction 515. In one embodiment, the "z" number can correspond to a number of flip-flops 415 along the respective second direction when transmitting messages from one functional unit 405 to the next subsequent unit 405. That is, each flip-flop delay correction 515 can compensate for a delay associated with transmitting the message through one (1) flip-flop 415 as described with reference to FIG. 4. In one embodiment, FIG. 6 illustrates a second direction correction 610. For example, to transmit the message from functional unit 405-b to functional unit 405-c along the second direction (e.g., along a Y-direction or a vertical direction going from top to bottom), the message goes through four (4) flip-flops 415—e.g., through one (1) flip-flop 415 in functional unit 405-b and three (3) flip-flop 415 in functional unit 405-c. Accordingly, in this embodiment the second direction delay component 530-a can include four (4) FF delay correction 515—e.g., one for each flip-flop 415 encountered in the second direction. In some embodiments, the delay correction component 422 can store a time associated with transmitting the message through one (1) flip-flop in the first direction and delay the message by that time at each FF delay correction 515—e.g., the delay circuit could store the time in seconds, milliseconds, microseconds, nanoseconds, picoseconds, etc. In other embodiments, the delay circuit could store the time as a portion of the clock cycle taken to process the message at a respective flip-flop 415—e.g., store that each flip-flop 415 delays the message by a quarter (¼) of a clock cycle.

In one embodiment multiplexer 550 is configured to output a total correction 525—e.g., a total correction in the first and second directions. In at least one embodiment, the total correction 525 is delayed by a first amount in the first direction and a second amount in the second direction. In at least one embodiment, the total correction is a difference between a distance from the functional unit 205 to a farthest away functional unit 210 and a distance from functional unit 205 to the respective functional unit 405.

Figure 7:
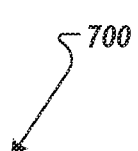
FIG. 7 is a flow diagram for a method for transmission offset rate limiting, in accordance with at least some embodiments.
Figure 7:
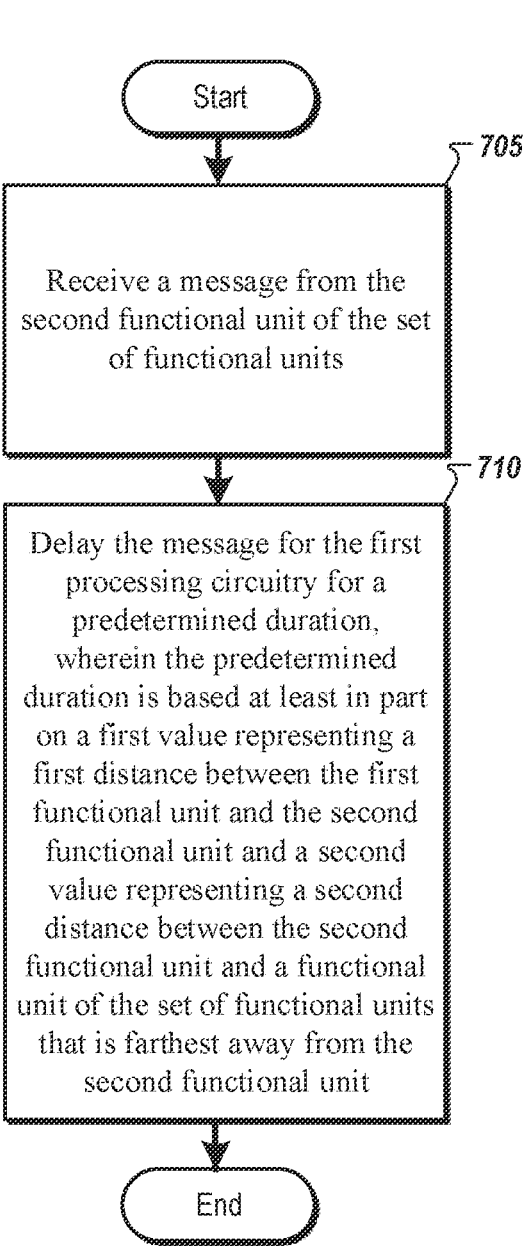

FIG. 7 illustrates a flow diagram of a method 700 for circuitry routing and delay correcting in a multi-functional unit system. The method 700 can be performed by processing logic comprising hardware, software, firmware, or any combination thereof. In at least one embodiment, the method 700 is performed by functional unit 405, delay circuit 410, and delay correction component 422 as described with reference to FIG. 4. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. In some embodiments, the method 700 is performed in an integrated circuit that includes a set of functional units comprising at least a first functional unit and a second functional unit. The first functional unit can include first processing circuitry and a first circuit, while a third functional unit can include second processing circuitry and a second circuit.

At operation 705, processing logic (e.g., processing logic of the first circuit) is configured to receive a message from the second functional unit of the set of functional units. For example, the first circuit can receive a message from functional unit 205, as described with reference to FIG. 2—e.g., from a functional unit configured to transmit messages to multiple functional units, where each message is to be processed at the respective functional unit simultaneously. In one embodiment, the message is a first type of message to be processed at two or more functional units at a same time. In some embodiments, the second functional unit is to transmit messages of the first type via a second circuit and transmit messages of a second type via a mesh interconnect. That is, the functional units can transmit regular messages via the mesh interconnect but transmit messages intended to be processed at multiple functional units the a same time via the delay circuit 410 as described with reference to FIG. 4. In some embodiments, the message indicates an event or an initiation of a timer—e.g., the message can indicate to initialize and come out of reset or indicate to start a local functional unit timer.

At operation 710, processing logic can delay the message for the first processing circuitry for a predetermined duration, where the predetermined duration is based at least in part on a first value representing a first distance between the first functional unit and the second functional unit and a second value representing a second distance between the second functional unit and a functional unit of the set of functional units that is farthest away from the second functional unit. For example, the first functional unit could be functional unit 210-*i* and the second functional unit can be 205 as illustrated in FIG. 3. Accordingly, the first distance can be the distance between functional unit 205 and functional unit 210-*i* (e.g., three (3) or (2,1) as a coordinate). The second distance can be the distance between the functional unit 205 and the functional unit 210-*t* (e.g., the farthest away functional unit having a distance seven (7) or (5,2)). That is, the first value can indicate a third distance between the first functional unit and the second functional unit in a first direction and a fourth distance between the first functional unit and the second functional unit in a second direction—e.g., when using the coordinate system as described with reference to FIGS. 2 and 3, there can be a horizontal and vertical distance represented by the coordinates. In at least one embodiment, the predetermined duration is based on a difference between the second value and the first value as described with reference to FIGS. 5 and 6 e.g., the difference between (5,2) and (2,1); (3,1). By determining the difference, the delay correction component 422 can apply the first direction correction and the second direction correction for the overall delay correction as described with reference to FIGS. 4-6.

As the message is to be processed simultaneously, processing logic of the second circuit can receive the message from the second functional unit of the set of functional units. The processing logic of the second circuit can delay the message for the second processing circuitry for a second predetermined duration, where the second predetermined duration is based at least in part on a third value representing a third distance between the third functional unit and the second functional unit and the second value representing the second distance between the second functional unit and the functional unit of the set of functional units that is farthest away from the second functional unit. In such embodiments, the message is received at the first circuit at a first time, and the message is received at the second circuit at a second time after the first time—e.g., the third functional unit can be functional unit 210-*r* that receives the message after functional unit 210-*i* due to being farther away. In such embodiments, the processing logic of the second circuit can determine a difference between (3,2) (e.g., coordinates of functional unit 210-*r* and the distance between the functional unit 205 and functional unit 210-*r*) and functional unit 210-*t* (e.g., 5,2) to determine the correction (e.g., 2,0)—e.g., there can be no correction in the second direction as both functional unit 210-*r* and functional unit 210-*t* are the same second distance away from functional unit 205. In at least one embodiment, by delaying the message at the first and third functional units, the first processing circuitry is to process the message at a same time as the second processing circuitry. In some embodiments, the predetermined duration is different than the second predetermined duration.

Figure 8:
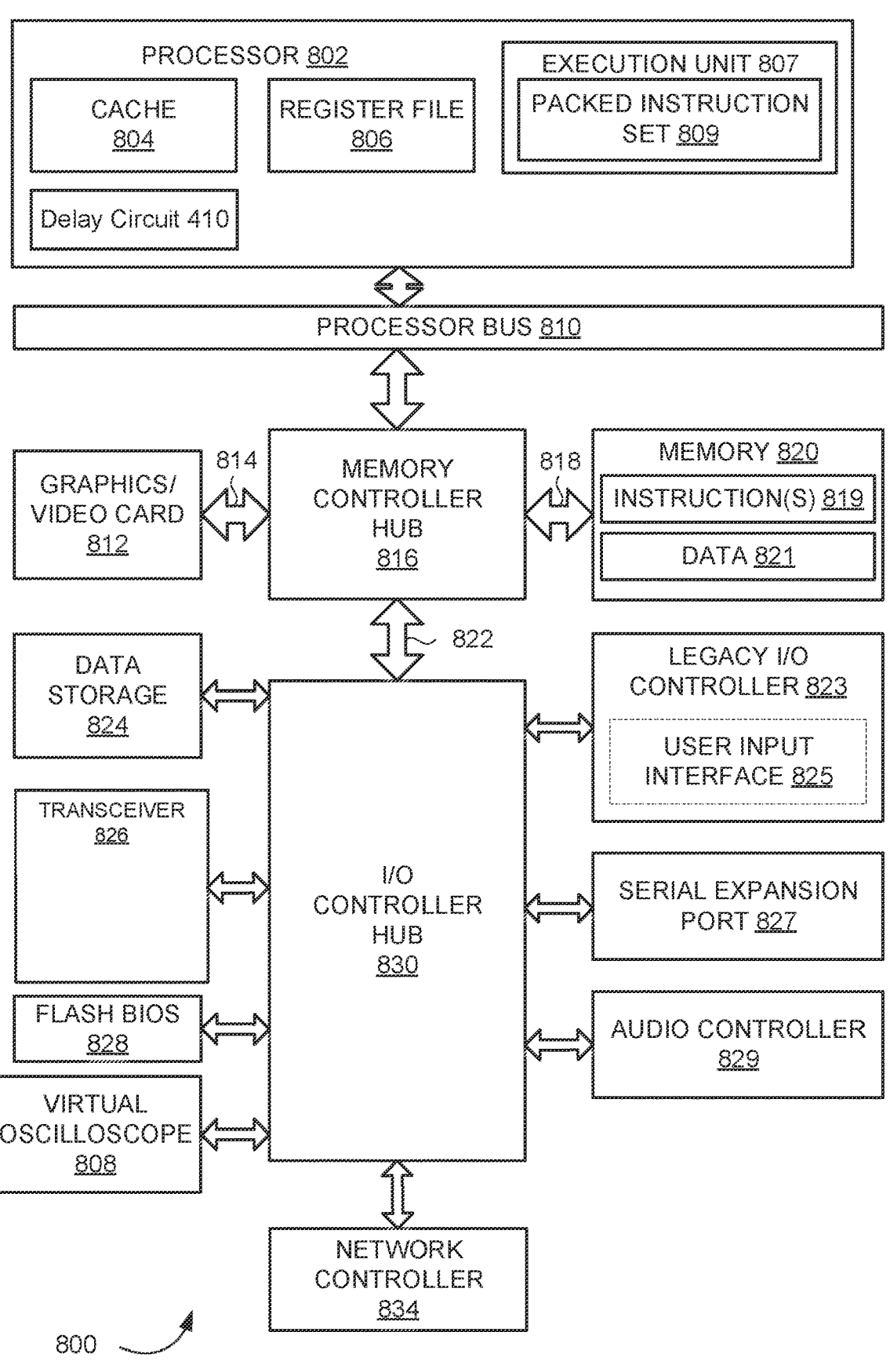
FIG. 8 illustrates an example computer system including a transceiver including a chip-to-chip interconnect, in accordance with at least some embodiments.

FIG. 8 illustrates a computer system 800 in accordance with at least one embodiment. In at least one embodiment, computer system 800 may be a system with interconnected devices and components, an SOC, or some combination. In at least one embodiment, computer system 800 is formed with a processor 802 that may include execution units to execute an instruction. In at least one embodiment, computer system 800 may include, without limitation, a component, such as processor 802 to employ execution units including logic to perform algorithms for processing data. In at least one embodiment, computer system 800 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 800 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 800 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 800 may be used in devices such as graphics processing units (GPUs), network adapters, central processing units and network devices such as switch (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 800 may include, without limitation, processor 802 that may include, without limitation, one or more execution units 807 that may be configured to execute a Compute Unified Device Architecture (CUDA®), which is developed by NVIDIA Corporation of Santa Clara, CA. In at least one embodiment, a CUDA program is at least a portion of a software application written in a CUDA programming language. In at least one embodiment, computer system 800 is a single processor desktop or server system. In at least one embodiment, computer system 800 may be a multiprocessor system. In at least one embodiment, processor 802 may include, without limitation, a CISC microprocessor, a RISC microprocessor, a VLIW microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. In at least one embodiment, processor 802 may also include a combination of both internal and external caches. In at least one embodiment, a register file 806 may store different types of data in various registers including, without limitation, integer registers, floating point registers, status registers, and instruction pointer register.

In at least one embodiment, execution unit 807, including, without limitation, logic to perform integer and floating point operations, also resides in processor 802. Processor 802 may also include a microcode ("ucode") read only memory ("ROM") that stores microcode for certain macro instructions. In at least one embodiment, execution unit 807 may include logic to handle a packed instruction set 809. In at least one embodiment, by including packed instruction set 809 in an instruction set of a general-purpose processor 802, along with associated circuitry to execute instructions, operations used by many multimedia applications may be performed using packed data in a general-purpose processor

802. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, an execution unit may also be used in microcontrollers, embedded processors, graphics devices, DSPs, and other types of logic circuits. In at least one embodiment, computer system 800 may include, without limitation, a memory 820. In at least one embodiment, memory 820 may be implemented as a DRAM device, an SRAM device, flash memory device, or other memory device. Memory 820 may store instruction(s) 819 and/or data 821 represented by data signals that may be executed by processor 802.

In at least one embodiment, a system logic chip may be coupled to processor bus 810 and memory 820. In at least one embodiment, the system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data and textures. In at least one embodiment, MCH 816 may direct data signals between processor 802, memory 820, and other components in computer system 800 and to bridge data signals between processor bus 810, memory 820, and a system I/O 822. In at least one embodiment, system logic chip may provide a graphics port for coupling to a graphics controller. In at least one embodiment, MCH 816 may be coupled to memory 820 through high bandwidth memory path 818, and graphics/video card 812 may be coupled to MCH 816 through an Accelerated Graphics Port ("AGP") interconnect 814.

In at least one embodiment, computer system 800 may use system I/O 822 that is a proprietary hub interface bus to couple MCH 816 to I/O controller hub ("ICH") 830. In at least one embodiment, ICH 830 may provide direct connections to some I/O devices via a local I/O bus. In at least one embodiment, the local I/O bus may include, without limitation, a high-speed I/O bus for connecting peripherals to memory 820, a chipset, and processor 802. Examples may include, without limitation, an audio controller 829, a firmware hub ("flash BIOS") 828, a transceiver 826, a data storage 824, a legacy I/O controller 823 containing a user input interface 825 and a keyboard interface, a serial expansion port 827, such as a USB, and a network controller 834. Data storage 824 may comprise a hard disk drive, a floppy disk drive, a CD-ROM device, a flash memory device, or other mass storage device. In an embodiment, the transceiver 826 includes a constrained FFE 808.

In at least one embodiment, FIG. 8 illustrates a system, which includes interconnected hardware devices or "chips" in a transceiver 826—e.g., the transceiver 826 includes a chip-to-chip interconnect including the first device and second device as described with reference to FIG. 1). In at least one embodiment, FIG. 8 may illustrate an exemplary SoC. In at least one embodiment, devices illustrated in FIG. 8 may be interconnected with proprietary interconnects, standardized interconnects (e.g., PCIe), or some combination thereof and utilize a GRS link. In at least one embodiment, one or more components of system 800 are interconnected using compute express link ("CXL") interconnects. In an embodiment, the processor 802 can include a delay circuit 410 as described with reference to FIG. 4. In at least one embodiment, the delay circuit 410 can delay incoming messages (e.g., latency-sensitive messages) for a predetermined duration as described with reference to FIGS. 4-7. For example, the delay circuit 410 can delay messages based on a first distance between the functional unit and a first functional unit that transmits the message originally. The delay circuit 410 can also delay the message based on the second distance between the first functional unit and a farthest away functional unit. For example, the delay circuit 410 can determine a difference between the second distance and the first distance and delay the message accordingly as described with reference to FIGS. 4-7. p The techniques described herem improve the operation of integrated circuits by enabling hardware-based alignment of messag cessing across multiple functional units, thereby mitigating timing differ ences ssociated with n magation and avoiding the need for additional point-to-point wiring for simultaneous message delivery.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of the following claims) is to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium or a computer-readable medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In the description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout the specification terms such as "processing," "computing," "calculating," "determining," or like, refer to action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory and transforms that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that the subject matter claimed in the appended claims is not necessarily limited to specific features or acts described. Rather, specific features and acts are disclosed as examples of implementing the claims.

What is claimed is:

1. An integrated circuit comprising:
a set of functional units comprising at least a first functional unit and a second functional unit, wherein the first functional unit comprises:
first processing circuitry; and
a first delay circuit located within the first functional unit and coupled to the first processing circuitry, wherein the first delay circuit comprises a plurality of delay components, and wherein the first delay circuit is to:
receive a message from the second functional unit of the set of functional units; and
delay the message for the first processing circuitry for a predetermined duration using a number of the plurality of delay components, wherein the predetermined duration is based at least in part on a first value representing a first distance between the first functional unit and the second functional unit and a second value representing a second distance between the second functional unit and a functional unit of the set of functional units that is farthest away from the second functional unit.

2. The integrated circuit of claim 1, wherein the set of functional units comprises at least a third functional unit comprising:
second processing circuitry; and
a second delay circuit located within the third functional unit and coupled to the second processing circuitry, wherein the second delay circuit comprises a second plurality of delay components, and wherein the second delay circuit is to:
receive the message from the second functional unit of the set of functional units; and
delay the message for the second processing circuitry for a second predetermined duration using a number of the second plurality of delay components, wherein the second predetermined duration is based at least in part on a third value representing a third distance between the third functional unit and the second functional unit and the second value representing the second distance between the second functional unit and the functional unit of the set of functional units that is farthest away from the second functional unit.

3. The integrated circuit of claim 2, wherein the first processing circuitry is to process the message at a same time as the second processing circuitry.

4. The integrated circuit of claim 2, wherein the predetermined duration is different from the second predetermined duration.

5. The integrated circuit of claim 2, wherein:
the message is received at the first delay circuit at a first time; and
the message is received at the second delay circuit at a second time after the first time.

6. The integrated circuit of claim 1, wherein the first value indicates a third distance between the first functional unit and the second functional unit in a first direction and a fourth distance between the first functional unit and the second functional unit in a second direction.

7. The integrated circuit of claim 1, wherein:
the message is a first type of message to be processed at two or more functional units at a same time; and
the second functional unit is to transmit messages of the first type via a second circuit and transmit messages of a second type via a mesh interconnect.

8. The integrated circuit of claim 1, wherein the message indicates an event or an initiation of a timer.

9. The integrated circuit of claim 1, wherein the predetermined duration is based on a difference between the second value and the first value.

10. A device comprising:
a first functional unit of a set of functional units, the first functional unit comprising:
processing circuitry; and
a first delay circuit located within the first functional unit and coupled to the processing circuitry, wherein the first delay circuit comprises a plurality of delay components, and wherein the first delay circuit is to:
receive a message from a second functional unit of the set of functional units; and
delay the message for the processing circuitry for a predetermined duration using a number of the delay components, wherein the predetermined duration is based at least in part on a first value representing a first distance between the first functional unit and the second functional unit and a second value representing a second distance between the second functional unit and a functional unit of the set of functional units that is farthest away from the second functional unit.

11. The device of claim 10, wherein the processing circuitry is to process the message at a same time as a third functional unit of the set of functional units.

12. The device of claim 10, wherein:
the message is a first type of message to be processed at two or more functional units at a same time; and
the second functional unit is to transmit messages of the first type via a second circuit and transmit messages of a second type via a mesh interconnect.

13. The device of claim 10, wherein the first value indicates a third distance between the first functional unit and the second functional unit in a first direction and a fourth distance between the first functional unit and the second functional unit in a second direction.

14. The device of claim 10, wherein the message indicates an event or an initiation of a timer.

15. The device of claim 10, wherein the predetermined duration is based on a difference between the second value and the first value.

16. A method of operating an integrated circuit with a set of functional units, the method comprising:
receiving, at a first delay circuit located within a first functional unit, a message from a second functional unit;
delaying, using a number of delay components of the first delay circuit, the message for a predetermined duration for first processing circuitry of the first functional unit, wherein the predetermined duration is based at least in part on a first value representing a first distance between the first functional unit and the second functional unit and a second value representing a second distance between the second functional unit and a functional unit of the set of functional units that is farthest away from the second functional unit; and
processing, using the first processing circuitry, the message after the predetermined duration.

17. The method of claim 16, further comprising:

receiving, at a second delay circuit located within a third functional unit, the message from the second functional unit;

delaying, using a number of delay components of the second delay circuit, the message for a second predetermined duration for second processing circuitry of the third functional unit, wherein the second predetermined duration is based at least in part on a third value representing a third distance between the third functional unit and the second functional unit and the second value representing the second distance between the second functional unit and the functional unit of the set of functional units that is farthest away from the second functional unit; and processing, using the second processing circuitry, the message after the second predetermined duration.

18. The method of claim 17, wherein the first processing circuitry is to process the message at a same time as the second processing circuitry.

19. The method of claim 17, wherein the predetermined duration is different from the second predetermined duration.

20. The method of claim 17, wherein:

the message is received at the first delay circuit at a first time; and the message is received at the second delay circuit at a second time after the first time.

\* \* \* \* \*